United States Patent
Heiferman et al.

(10) Patent No.: US 10,198,487 B2
(45) Date of Patent: *Feb. 5, 2019

(54) SYSTEM AND A METHOD FOR ORGANIZING REAL-WORLD GROUP GATHERINGS AROUND A TOPIC OF INTEREST

(71) Applicant: Meetup, Inc., New York, NY (US)

(72) Inventors: Scott Heiferman, New York, NY (US); Peter Kamali, Scranton, PA (US); Matthew Meeker, Brooklyn, NY (US); Peter Steinberg, Brooklyn, NY (US); Dervala Hanley, Brooklyn, NY (US)

(73) Assignee: Meetup, Inc., New York, NY (US)

( * ) Notice: Subject to any disclaimer, the term of this patent is extended or adjusted under 35 U.S.C. 154(b) by 812 days.

This patent is subject to a terminal disclaimer.

(21) Appl. No.: 14/718,446

(22) Filed: May 21, 2015

(65) Prior Publication Data

US 2016/0259829 A1    Sep. 8, 2016

Related U.S. Application Data

(63) Continuation of application No. 10/710,055, filed on Jun. 15, 2004, now Pat. No. 9,135,663.

(Continued)

(51) Int. Cl.
*G06Q 10/10*    (2012.01)
*G06Q 30/02*    (2012.01)
(Continued)

(52) U.S. Cl.
CPC ...... *G06F 17/30554* (2013.01); *G06F 3/0482* (2013.01); *G06F 3/04842* (2013.01);
(Continued)

(58) Field of Classification Search
CPC ...................................................... G06Q 50/01
(Continued)

(56) References Cited

U.S. PATENT DOCUMENTS 5,796,395 A * 8/1998 de Hond ........... G06F 17/30554
709/203
5,842,009 A   11/1998 Borovoy et al.
(Continued)

FOREIGN PATENT DOCUMENTS

KR    20020045929 A    6/2002
KR    1020060114986 A    11/2006

OTHER PUBLICATIONS

"Meetup Launces", Simon Willison's Weblog, http://simonwillison.net, Jun. 15, 2002.
www.glish.com, Online Weblog Archive, Jun. 15, 2002.

*Primary Examiner* — Jonathan P Ouellette
(74) *Attorney, Agent, or Firm* — The Webb Law Firm

(57) ABSTRACT

A computer-assisted method, computer system, and program product provide the functionality of a portal for persons to find, based on a topic of interest, the nearest relevant in-person gathering of other persons interested in the topic as well. The system provides for the automated creation of groups and for their automatic sustainment through automatic scheduling of periodic gatherings. Strangers in geographic proximity are automatically brought together into chapters formed around the topic of interest. Chapters may be led by organizers, and gatherings may have hosts. Automatic functions for venue selection, venue voting, cancellation, and feedback are provided.

20 Claims, 4 Drawing Sheets

Related U.S. Application Data

(60) Provisional application No. 60/478,345, filed on Jun. 16, 2003.

(51) Int. Cl.
| | | |
|---|---|---|
| *G06Q 99/00* | (2006.01) | |
| *G06F 17/30* | (2006.01) | |
| *G06Q 50/00* | (2012.01) | |
| *G06F 3/0482* | (2013.01) | |
| *G06F 3/0484* | (2013.01) | |
| *H04L 29/06* | (2006.01) | |

(52) U.S. Cl.
CPC ....... *G06F 17/30241* (2013.01); *G06Q 50/01* (2013.01); *H04L 65/403* (2013.01)

(58) Field of Classification Search
USPC .................................................. 705/1.1–912
See application file for complete search history.

(56) References Cited

U.S. PATENT DOCUMENTS

| | | | |
|---|---|---|---|
| 5,963,913 A | | 10/1999 | Henneuse et al. |
| 6,052,122 A | * | 4/2000 | Sutcliffe ................ G06Q 30/02 707/999.003 |
| 6,060,995 A | * | 5/2000 | Wicks ................ H04W 84/022 340/7.48 |
| 6,061,681 A | * | 5/2000 | Collins .................. G06Q 30/08 |
| 6,434,599 B1 | * | 8/2002 | Porter ................ H04L 12/1818 709/204 |
| 6,519,629 B2 | | 2/2003 | Harvey et al. |
| 6,549,768 B1 | * | 4/2003 | Fraccaroli ............... H04L 51/20 455/445 |
| 6,571,234 B1 | * | 5/2003 | Knight ................... G06Q 10/10 |
| 6,738,065 B1 | | 5/2004 | Even-Zohar |
| 6,819,919 B1 | | 11/2004 | Tanaka |
| 7,082,402 B2 | | 7/2006 | Conmy et al. |
| 7,113,797 B2 | | 9/2006 | Kelley et al. |
| 7,120,668 B2 | * | 10/2006 | Manber ............... H04L 12/1822 709/205 |
| 7,162,433 B1 | | 1/2007 | Foroutan |
| 7,236,976 B2 | | 6/2007 | Breitenbach et al. |
| 7,532,900 B2 | | 5/2009 | Wilson et al. |
| 7,640,312 B2 | | 12/2009 | DelGaudio et al. |
| 7,827,055 B1 | * | 11/2010 | Snodgrass .............. G06Q 30/02 705/14.73 |
| 9,563,708 B2 | * | 2/2017 | Gang ................. G06F 17/30867 |
| 2001/0014868 A1 | | 8/2001 | Herz et al. |
| 2001/0049449 A1 | * | 12/2001 | Becker ................. C07D 207/16 548/537 |
| 2002/0023018 A1 | * | 2/2002 | Kleinbaum ............ G06Q 30/02 705/26.4 |
| 2002/0032592 A1 | | 3/2002 | Krasnick et al. |
| 2002/0049742 A1 | | 4/2002 | Chan et al. |
| 2002/0107859 A1 | | 8/2002 | Tsuyuki |
| 2002/0184321 A1 | | 12/2002 | Fishman et al. |
| 2003/0028451 A1 | | 2/2003 | Ananian |
| 2003/0037110 A1 | * | 2/2003 | Yamamoto .......... H04M 3/5322 709/204 |
| 2003/0046296 A1 | | 3/2003 | Doss et al. |
| 2003/0061183 A1 | | 3/2003 | Schaffer et al. |
| 2003/0115203 A1 | | 6/2003 | Brown et al. |
| 2003/0189592 A1 | | 10/2003 | Boresjo |
| 2003/0191772 A1 | | 10/2003 | Schaumann et al. |
| 2004/0044673 A1 | | 3/2004 | Brady et al. |
| 2004/0078256 A1 | | 4/2004 | Glitho et al. |
| 2004/0098275 A1 | | 5/2004 | Hubert |
| 2004/0192299 A1 | | 9/2004 | Wilson et al. |
| 2006/0095376 A1 | | 5/2006 | Mitchell et al. |
| 2007/0253424 A1 | | 11/2007 | Herot et al. |
| 2007/0282661 A1 | | 12/2007 | Franco |
| 2008/0071874 A1 | | 3/2008 | Roodman et al. |
| 2008/0098313 A1 | | 4/2008 | Pollack |
| 2008/0294999 A1 | | 11/2008 | Bank et al. |
| 2008/0301568 A1 | | 12/2008 | Im et al. |
| 2009/0137298 A1 | | 5/2009 | Bedingfield, Sr. et al. |
| 2009/0222522 A1 | | 9/2009 | Heaney |
| 2010/0017371 A1 | | 1/2010 | Whalin et al. |
| 2010/0095225 A1 | | 4/2010 | Langlois et al. |
| 2011/0078026 A1 | | 3/2011 | Durham |
| 2011/0078716 A1 | | 3/2011 | MacWan |
| 2013/0124629 A1 | * | 5/2013 | Appelman ........ H04L 29/08684 709/204 |

\* cited by examiner

FIG. 1

Topics
- ❏ Automotive
- ❏ Books
- ❏ Cultures & Community
- ❏ Education
- ❏ Film/TV
- ❏ Financial
- ❏ Games
- ❏ Health
- ❏ Hobbies
- ❏ In The Market For...
- ❏ Internet & Technology
- ❏ Languages
- ❏ Music
- ❏ Pets
- ❏ Politics & Activism
- ❏ Religion
- ❏ Science
- ❏ Sports
- ❏ Work & Career

FIG. 2

Topics> Languages

- American Sign Language
  Next Gathering: Wednesday, June 16 @ 7:00PM
- Amharic Language
  Next Gathering: Wednesday, June 9 @ 6:00PM
- Arabic Language
  Next Gathering: Wednesday, June 9 @ 7:00PM
- British Sign Language
  Next Gathering: Monday, July 5 @ 7:00PM
- Bulgarian Language
  Next Gathering: Thursday, July 1 @ 8:00PM
- Cantonese Language
  Next Gathering: Saturday, June 12 @ 1:00PM

⋮

- Slovak Language
  Next Gathering: Monday, July 5 @ 6:00PM
- Spanish Language
  Next Gathering: Tuesday, June 15 @ 7:00PM
- Swahili
  Next Gathering: Saturday, July 10 @ 3:00PM
- Tagalog Language
  Next Gathering: Thursday, June 24 @ 7:00PM
- Thai Language
  Next Gathering: Saturday, June 19 @ 1:00PM
- Translator
  Next Gathering: Thursday, July 1 @ 7:00PM
- Turkish
  Next Gathering: Thursday, July 1 @ 8:00PM
- Urdu Language
  Next Gathering: Monday, June 21 @ 7:00PM
- Vietnamese Language
  Next Gathering: Tuesday, July 13 @ 8:00PM
- Visaya Language
  Next Gathering: Tuesday, July 13 @ 6:00PM
- Volapuk Language
  Next Gathering: Wednesday, July 7 @ 7:00PM
- Yiddish Language
  Next Gathering: Monday, June 21 @ 7:00PM
- Yoruba Language
  Next Gathering: Thursday, June 17 @ 8:00PM

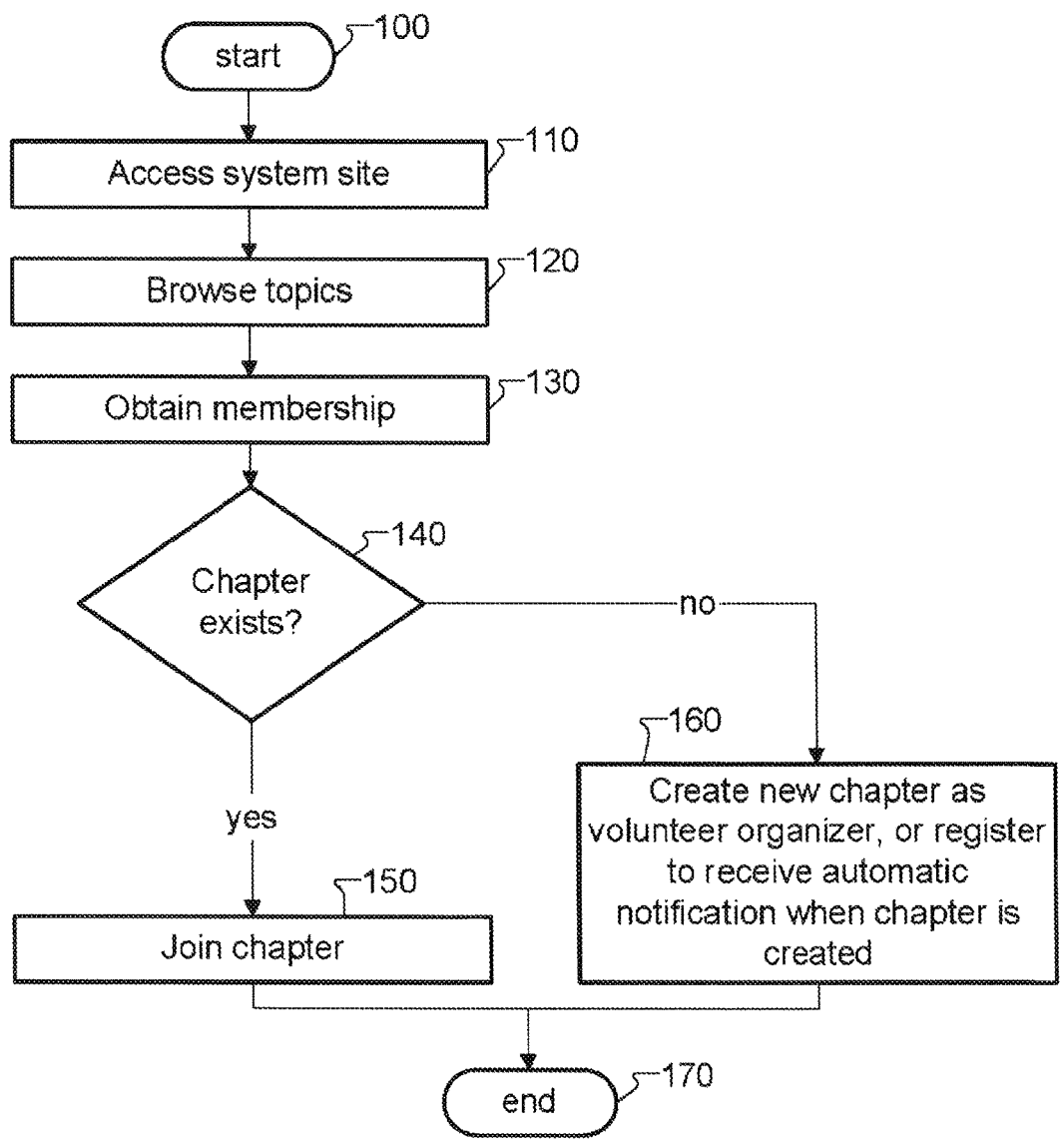

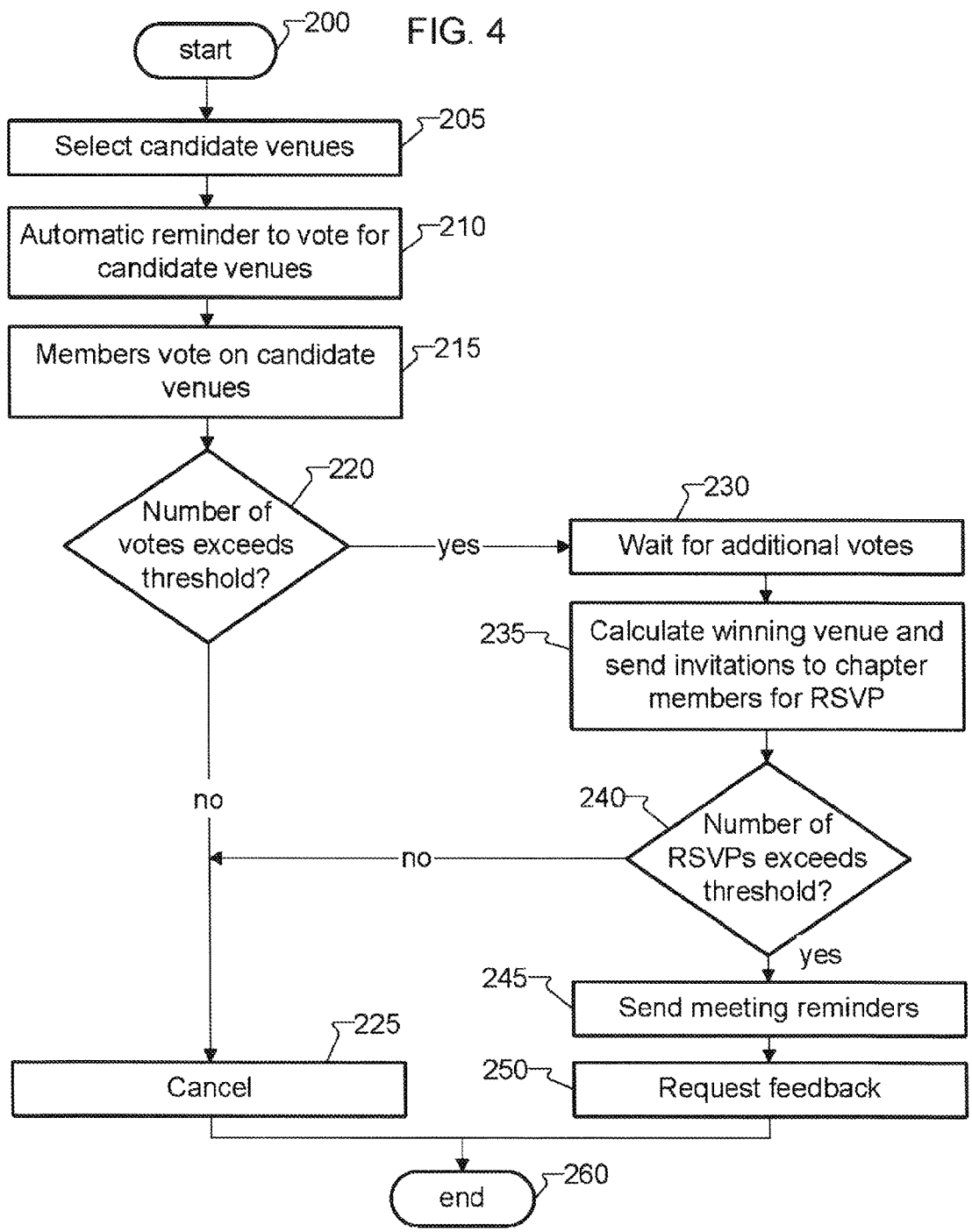

SYSTEM AND A METHOD FOR ORGANIZING REAL-WORLD GROUP GATHERINGS AROUND A TOPIC OF INTEREST

CROSS-REFERENCE TO RELATED APPLICATIONS

This application is a continuation of U.S. patent application Ser. No. 10/710,055, filed Jun. 15, 2004, which claims the benefit of U.S. Provisional Patent Application No. 60/478,345, entitled 'Automated System and Method for Organizing Multiple Real-World Gatherings around a Topic of Interest, through a Single Point of Entry,' filed on Jun. 16, 2003, the disclosures of which are incorporated by reference in their entirety.

BACKGROUND OF THE INVENTION

Field of the Invention

A system and a method consistent with the present invention broadly relates to organizing real-world gatherings. More particularly, the present invention is consistent with providing an automated, computer-assisted system and a method for organizing a real-world gathering for a particular topic of interest.

Description of the Related Art

The Internet now is one of the most popular sources for obtaining and sharing information. One popular activity associated with the Internet is communication between people, and notably people who may be separated by vast distances. Some familiar technologies that facilitate communication and involve the Internet include email, bulletin boards, virtual chat rooms, blogs, and instant message systems. This set of technologies, and those that are similar, are characterized by being substantially solely on-line.

In other words, the foregoing set of well-known Internet related applications support geographically distributed communications, and do not have as their objective anything more.

In spite of the increased ability to communicate on-line, however, many people still are interested in meeting together in person with other people who are interested in the same topic. What is needed is a way to harness the formidable communications capabilities of the Internet to help support and facilitate such in-person topic-related gatherings (herein, 'gatherings' and 'meetings' shall be interchangeably used, and shall unless otherwise noted refer to in-person gatherings).

The challenges of organizing real-world gatherings are much different from those of organizing online meetings. For example, to engage in online chat, there is no question of physical location, distance from home, availability of venue, or the like. All of the foregoing considerations and more, including intangibles such as social dynamics, make organizing real-world gatherings a more difficult and complex task.

Known Internet communication tools are insufficient for the task. In particular, email alone is inadequate because a person in one area has no organized way of approaching the problem of finding the identities and addresses of others in his area who are interested in a given topic and also interested in a topic-related meeting. Instant messaging and chat rooms alone are likewise inadequate for the same reasons.

Message boards and blogs are insufficient by themselves because these tools are not designed to allow a person to begin with a topic of interest, find an associated message board or blog that is relevant to the topic, and identify participants of the board or blog who are in a person's area and who are interested in an in-person topic-related meeting.

Internet dating and introduction services are related to the idea of in-person meetings, but only on a one-to-one model, and all of these services are agnostic with respect to a particular topic of interest; instead, such services focus on compatibility with the idea of forming a relationship and not on meeting in a group setting to discuss a given topic of mutual interest. In effect, these services facilitate only one-off (non-recurring) gatherings in only a single geographical locale.

Internet newsgroups are topic related, but provide no support to a person who wants to attend a topic-related meeting in person in his own geographic area.

Additionally, so-called 'social networking' services, such as SixDegrees, provide a system for users to be introduced to friends of friends via website communication and/or email, but again provide no support to a person who wants to attend a topic-related gathering in person in a selected geographic area.

Internet invitation services likewise are inadequate to fulfill the above-identified need. Such services, of which Evite is an example, allow users to enter the email addresses of invitees to private events. Automated invitations are sent by the service, and each invitee may accept or decline the invitation. Separately, users may browse or search the Evite website directory of public events, but all the events are one-off, non-recurring events, and all the events must be submitted by individual users choosing to publicize already existing events. It is impossible for persons who are not already acquainted to use the system to self-organize into groups, and to attend topic-related in-person gatherings with others in a given locale. Evite thus does not provide an automated method for strangers with a common interest to self-organize into real-world, local groups.

General information postings, such as ads or articles in print media and signs posted around town, are well known. This approach starts with a meeting at a date and time certain, and then advertises the meeting. Posting such notices in common locations such as a town square or popular bulletin board is now possible online as well. One such example of this approach is a 'craigslist' type website (see, e.g., dc.craigslist.com), where people wishing to advertise meetings can easily make such a posting. Such posting approaches, however, are limited in that they begin with a predetermined meeting location, date, and time, and require a group already to be formed. No self-formation of groups takes place, and the location of the posted meeting cannot be determined by those Interested in attending. Furthermore, the posted events are typically one-off, non-recurring events. Any group continuity depends on the efforts of the person doing the posting, and no support along these lines is provided by the website.

SUMMARY OF THE INVENTION

An objective of the invention, among other objectives which will become apparent from reading the description herein, is to provide an automated system to overcome the above-mentioned problems by facilitating local in-person gatherings of people brought together by a common interest.

One embodiment of the invention is a fully automated system in which the facilitation of such meetings does not include a person being designated as a group leader. Another embodiment of the invention provides for a group leader. In the description below, the invention will be taught first according to the leaderless embodiment, and afterward according to an embodiment that includes the concept of a group leader. Alternative embodiments will be presented as part of the discussion.

The below-described illustrative, non-limiting embodiments of the present invention overcome the above disadvantages and problems in the prior art, and also may provide solutions to other disadvantages and problems that were not described above. Also, a system that operates according to the teachings of the present invention is not necessarily required to overcome any of the particular problems or disadvantages described above. The appended claims should be consulted to ascertain the true scope of the invention.

It is an aspect of the present invention to provide a system and a method consistent with facilitating the creation, organizing, scheduling, and joining of in-person (also referred to as 'real-world') group gatherings around a topic of interest.

It is another aspect of the present invention to provide a system and a method consistent with organizing real-world gatherings on the same day in multiple localities for a particular topic of interest.

It is yet another aspect of the present invention to provide a system and a method consistent with facilitating voting by prospective participants on a venue for the real-world gathering for the topic of interest in a particular locale.

According to an embodiment of the present invention, a computer-assisted system and a method is provided for organizing gatherings. Gatherings may be periodic. They may be characterized as having a predetermined minimum number of participants. A given gathering may occur at a physical location determined by consensus or voting.

The method is topic-focused, and involves selecting a topic of interest, and also includes indicating a geographical area for one or more of the periodic gatherings. Furthermore, the method may involve selecting a physical location from a predetermined set of available physical locations within the indicated geographical area. The selection of the physical location may be based on one or more characteristics of the selected topic of interest.

Once the physical location is selected, each participant or potential participant may be notified of the next gathering and of the selected physical location. A request for a response/reservation may be sent. The number of reservations may be counted or otherwise determined, and when too few reservations are made, the system may cancel the next gathering and notify the participants of the cancellation.

Moreover, according to another embodiment of the present invention, the computer-assisted system and method further includes receiving and storing a location associated with a particular participant, and retrieving and providing the particular participant with a number of potential venues for having a gathering based on the identified topic of interest, according to the received location. The method according to this embodiment further includes voting on a preferred venue chosen from a number of potential venues and storing the results.

The system may then determine one or more actual venues based on the results from all the common participants who provided related locations and whether a minimum number of common participants exist by comparing a number of confirmed attendees with a threshold value. When at least the minimum number of common participants exists, a gathering on the identified topic of interest is scheduled to occur at the determined one or more actual venues. Once the gatherings are scheduled, the common participants are notified.

BRIEF DESCRIPTION OF THE DRAWINGS

The above aspects and other advantages of the present invention will become more apparent when taken in conjunction with the below descriptions of various illustrative, non-limiting embodiments thereof with reference to the accompanying drawings, in which:

FIG. 1 shows a specific embodiment of a highest level of a hierarchical arrangement of topics according to an embodiment of the invention.

FIG. 2 shows a specific example of a second-highest level of a hierarchical arrangement of topics according to an embodiment of the invention.

FIG. 3 shows an exemplary flow diagram for a part of the processing according to one embodiment of the invention.

FIG. 4 shows an exemplary flow diagram of another part of the processing according to an embodiment of the invention.

DETAILED DESCRIPTION

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and complete, and will fully convey the concept of the invention to those skilled in the art. The claims should be consulted to ascertain the true scope of the invention.

This Illustrative, non-limiting embodiment of the present invention is a software application that organizes real-world group gatherings around a topic of interest. The software application can be delivered to the user via a web-based graphical user interface. The software application can also be deployed over a dedicated computer network (e.g., a LAN or a WAN), or via a stand-alone computer system for a particular company, such as an intranet installation, or by some other means. For simplicity and ease of discussion, various illustrative, non-limiting embodiments of the present invention will be described with reference to an Internet/world wide web-based system, with the understanding that networks or communications systems similar to, but not identical with the Internet, may of course be used.

On a practical level, the software that enables the computer system to perform the operations described in further detail below may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of ordinary skill in the art will appreciate that 'media', or 'computer-readable media', as used here, may include a diskette, a tape, a compact disc, an integrated circuit, a ROM, a CD, a cartridge, a remote transmission via a communications circuit, or any other similar medium useable by computers now known or hereafter developed. For example, to supply software for enabling a computer system to operate in accordance with the invention, the supplier might provide a diskette or might transmit the software in some form via satellite transmission, via a direct telephone link, or via the Internet. Thus, the term, 'computer readable medium' is intended to include all of the foregoing and any other medium by which software may be provided to a computer.

Although the enabling software might be 'written on' a diskette, 'stored in' an integrated circuit, or 'carried over' a communications circuit, it will be appreciated that, for the purposes of this application, the computer usable medium will be referred to as 'including' the software. Thus, the term 'including' is intended to encompass the above and all equivalent ways in which software is associated with a computer usable medium. For the sake of simplicity, therefore, the term 'program product' is thus used to refer to a computer useable medium, as defined above, which includes in any form of software to enable a computer system to operate according to the above-identified invention. Thus, the invention is also embodied in a program product including software instructions which enable a computer or computers to organize a real-world gathering for a particular topic of Interest according to the invention.

In this illustrative, non-limiting embodiment, the system allows for an automated organization of a real-world gathering of two or more individuals around a common topic of interest. The gatherings are real-world, face-to-face meetings that take place in a number of cities and small towns in various countries around the world. The gatherings can take place at various venues such as local cafes, restaurants, stores, bar or other establishments.

The following terms are used throughout the specification and are defined as follows:

Topic: A subject or interest around which members of the system form groups, e.g., Pug Owners, Spanish Language, Environmental Defense.

Locale: A defined geographical location, even including definitions such as the area within a radius from a given zip or postal code.

Chapter: This is the intersection of a topic and a locale, e.g., Pug Owners, Louisville, Ky. In other words, it is a group of members organized locally around a topic of interest.

Gathering: A real-life, face-to-face meeting of a chapter. A gathering may be a periodic gathering, such as a monthly gathering, although other frequencies can be used. A gathering may be referred to as an in-person meeting, or a Meetup (Meetup is a trademark of Meetup, Inc.).

Organizer: Member who chooses to start and run a local chapter.

Venue: This is a meeting place, which may be suggested by the system or a member, e.g., a restaurant, a café, a park, a library, a private home, etc.

A system according to this embodiment of the Invention automates the organization of real-world gatherings around a topic of interest. A visitor to the system (which may be referred to as a member or participant) typically provides his or her location via a zip code, postal code, or city, then searches or browses for a topic of interest, e.g., Spanish Language. The system may return a list of local chapters that meet for Spanish Language conversation practice, sorted by distance from the user's location. In addition, the visitor can search for a topic of interest without providing a locale. That is to say, the order of providing locale information and topic of interest information is not critical in this embodiment.

The topics of interest and the locales may be organized using a multiple-level hierarchy. For example, as shown in FIG. 1, a set of highest level topics may be defined, and linked to sub-topics in a known manner. Activating the link to 'Language' in the set of highest level topics may result in a display of sub-topics such as shown, for example, in FIG. 2.

FIG. 2 represents an embodiment in which, regardless of the user's locale, there is defined a date and time certain for the topic. Thus, a user interested in the particular topic of 'Spanish Language' can, in the embodiment shown in FIG. 2, be provided with the worldwide date and time for the in-person meeting relating to the Spanish language, independent of locale.

Going further with the example, assuming the user has already provided his locale information by indicating a relevant zip code, city name, latitude/longitude information, or the like, information about the next meeting or gathering of the local chapter for the particular topic may be provided by activating the 'Spanish Language' link.

In the situation in which no chapter existed already in the user's locale, the user could be presented with nearby locales having chapters for that particular topic. In one instance of the invention, the system will automatically instantiate a chapter when a user searches for a topic and a locale where no chapter currently exists.

Instead of searching through a hierarchy of topics, the system may provide a user with the ability to carry out a keyword-based search. It will be appreciated that other variations on topic selection are possible and are within the scope of the invention.

When the user searches for a topic of interest without the locale being known by the system, the user may be provided with the topic information and the information about all the chapters associated with this topic. Once the visitor selects and/or finds a locale and a topic of interest, the visitor has found a chapter (it will be recalled from the definitions section, above, that the chapter is an intersection of a particular topic and a locale).

The visitor may be presented with available information about the chapter, including, without limitation: a number of members in the chapter, member photos and biographies, a chapter creation date, a brief description of the chapter, a longer description, a calendar of events, event photos, message boards and so on. In the embodiment in which there is a chapter organizer, the organizer's identity may be indicated along with relevant organizer information.

In addition, a local chapter may also provide information about other chapters worldwide. This information may include details on nearby chapters, numbers of members worldwide, photos of members worldwide, and links to their message boards.

The system may also provide communications tools for members to communicate between chapters, e.g., a topic-level message board 'General Spanish Language Board' and web logging tools 'General Spanish Language Blog.' Chapter information may be split up into a number of logical parts, which can be easily navigated e.g., through the use of tabs. Those familiar with this field will understand that other variations are possible and are within the scope of the invention.

In this exemplary system, gatherings may be organized for one or more types of chapters. One type of chapter is a leaderless chapter, according to a first embodiment of the invention. In a leaderless chapter, the system operates completely automatically, including fully automatic selection of the date and the time for the gathering, and the candidate venues for the users. That is, a gathering is automatically scheduled by the system.

In the first embodiment of the invention, there may be provided a system administrator who has a manual override capability to handle special scheduling problems, but a feature of the first embodiment is that there is provided a fully automated manner of facilitating in-person, topic-related meetings of persons, by geographic area. For the sake of linguistic convenience, a chapter according to this first embodiment of the invention may be referred to as a leaderless chapter.

According to a second embodiment of the invention, there is provided another type of chapter, having a person who is denominated as an organizer. It will be understood that 'organizer' is used as a term of linguistic convenience, and is meant to generally refer to the idea of a person who is a contact person, and allows for situations in which the organizer is a group leader, a moderator, a facilitator, a secretary, or any other similar role. It will be understood that the automated system is performing an important and significant amount of the organizing itself.

A chapter according to this second embodiment of the invention, having an organizer, may be thought of for the sake of linguistic convenience, as a led chapter.

In a led chapter, local organizers are free to take part in the larger event, and/or to set their own day and time to meet. In one embodiment, organizers may select from a list of other chapters and topics to affiliate with. For example, the organizer of a local Christian Athletes chapter is provided by the system the ability to indicate an affiliation with the local Bible Study chapter as well as with other Christian Athletes chapters in nearby towns. That is, affiliations can be geographical and/or topical. Such affiliations may be listed on that organizer's local chapter home page.

Organizers, according to another embodiment, can allow the system to create an automatic voting ballot of two or more candidate venues (i.e., utilize a predetermined set of venues already in the system), but make changes prior to releasing the voting ballot for voting. The organizer may add extra venues, or replace venues on the system's voting ballot. Moreover, the organizer may nominate new venues, including private homes (i.e., utilize a set of venues that was not selected from the predetermined set of venues already in the system).

In another embodiment, the organizer may simply choose a venue for the gathering, thereby overriding the need to vote.

Organizers may be provided with tools for managing their chapter. They may use the system to send notifications and messages directly to members. They may create polls and ballots to survey members on particular subjects, for example, choosing activities or agenda items. They may limit or terminate membership in the chapter, and grant member privileges such as the ability to choose or nominate a venue, edit messages, edit profile information, and so on.

In general, the system may require a user become a member before providing any specific information about chapters or members. For example, the system may require the user to furnish a verifiable email address and a password as a precondition of membership, or other information as well, including a zip code or other geographic locale indicator.

Once a member, a user may be permitted to join a local chapter of any type. The user may then receive a welcome message and an automated email notification of a real-life, face-to-face gathering. In addition, the user may set his profile for the chapter including nicknames (usernames), personal biographical or other information, personal pictures, email contact options (allowing other members of the chapter to contact them), and other related information. The member may set up different profiles for different chapters. In addition, the member may set up alerts. For example, the member may set up an alert to receive a notification when a new message is posted to the message board.

The members may volunteer to be a host for an upcoming gathering. A host is different from an organizer, although both functions could of course be performed by the same person at a given time. A host is an attendee of a gathering who helps get the meeting started by helping attendees find each other. The host function is important because the people who attend a meeting may never have met, and because the venue may be large or noisy, making it difficult for such persons to actually connect with each other.

A host may perform some simple tasks to facilitate the gathering, such as printing out a sign and putting it on a tabletop, or bringing nametags and a marker. According to one embodiment of the invention, the system includes functions for automatically generating flyers, nametags, and/or table top signs for the chapter. The message on such promotional materials is specific to each chapter. The host just needs to print them out and bring them to the gathering.

According to one embodiment of the invention, the system may automatically schedule a worldwide or nationwide repeating gathering day, such as an 'International Spanish Language Day.' According to this embodiment, the system may schedule the periodic gathering for all chapters of the 'Spanish Language' particular topic on the same day, and optionally at the same time, all over the world. Here, 'at the same time' can mean an identical local time, in which case the chapters in different time zones are not meeting contemporaneously. It can also mean an identical time regardless of time zone, such as a standard time for chapters to meet all across the world. In other words, for a given topic, an identical calendar date and optionally an identical time is used for the automatic scheduling of the in-person gatherings for all of the chapters associated with the topic.

According to another embodiment, local chapters may set their own day and time to meet by carrying out a voting operation facilitated by the system or by a chapter organizer setting a day, time and recurrence using tools provided by the system.

The advantages of a worldwide or national gathering day are several. For example, assume the particular topic 'Yoga' has a worldwide gathering day of the first Saturday of every month at 12 pm. A local Yoga chapter gathering at 12 pm on the first Saturday of the month in Washington D.C. knows that Yoga chapters all over the world are gathering at their own local time. Because of this arrangement, national media can be used to inform the public of such meetings, and national organizations can direct people to the local version of the topic, e.g., the Yoga chapters can announce that Monday, April 12th is this month's Yoga day. By providing a single website URL, for example, interested persons can automatically be directed to the local chapter nearest them. Likewise, using the system itself, interested persons can select 'Yoga' as a topic of interest, and provide their geographic locale Information, and be directed to the nearest chapter.

Furthermore, the automatic, periodic scheduling of a gathering, whether worldwide or only local, constitutes a means whereby the system (which may have automatically formed a chapter out of a group of strangers) automatically takes the steps necessary to keep the group alive on an ongoing basis. The system therefore not only automatically helps groups emerge, but also helps sustain them.

An exemplary embodiment of the invention will now be described with respect to FIG. 3, in which one example for implementing part of a system according to the invention will be described.

FIG. 3 shows one way to add new members to chapters. The process begins at step 100 which assumes that the user has some means for accessing the Internet, such as a personal computer, web-enabled phone, web-enabled television, connected PDA, or other Internet capable appliance. Step 100 also assumes that the user's appliance also has some communication means for accessing the internet, such as a dial-up service, a wired service, a wireless service, or the like.

In step 110, the user accesses a web site of the system according to the invention. The user may be provided with a variety of information, such as the already mentioned capability to search topic by keyword, or hierarchical list, or the like. The user takes advantage of such capabilities, and browses through the topics according to his personal interest in step 120, eventually selecting a topic of interest. The system thus receives a user selection of a topic from the plurality of predefined topics.

In step 130, the user is prompted to obtain a membership by providing, for example, a verifiable email address or the like, and information about the locale in which the user may be considered normally to exist. The information about the locale may be thought of as a user indication of a geographic locale. It is possible to grant membership in any of a variety of ways known to those familiar with this field. Once the membership is obtained, processing continues to step 140.

In step 140, a determination is made as to whether a chapter, corresponding to the geographic locale and the topic, exists. If so, processing may continue to step 150 in which the user is added to the chapter that corresponds to the selected topic and the geographic locale to which the user belongs. Another way to put this is to say the user may be added to a chapter selected on the basis of a topic and a locale. The adding of the user to the chapter as a member may be automatic or in response to a user indication. The system provides an indication to the user of the one chapter that was determined based on the topic and the geographic locale. The user may also be provided with information relating to the respective members of the chapter and the date and time of the next gathering. The user may take an action to indicate that he or should would like to become a member of the chapter, and to receive notification of chapter gatherings and activities, or the membership assignment may automatically be performed.

When no chapter exists, processing continues to step 160 in which a user may volunteer to create a new chapter as a volunteer organizer (according to the second embodiment of the invention described above) or, wait until a chapter is formed (automatically as in the first embodiment or otherwise). If the user volunteers to organize a new chapter, this indication is made by the user to the system and may be thought of as an organizer volunteer indication. If the user waits until a chapter is formed, the system may send an automatic notification of the chapter's creation to interested persons such as the user.

Processing ends in step 170 in FIG. 3, but it will be appreciated that the steps need not be performed necessarily in the order just mentioned, and it will also be appreciated that a member may join a number of different chapters in the locale depending on the interests of the member.

FIG. 4 shows one manner of implementing part of a system according to the invention, in which the automatic scheduling of a meeting is performed. The example shown relates to the embodiment in which chapters do not have organizers, but may understood to apply, mutatis mutandis, to the embodiment in which chapters do have organizers.

Processing begins at step 200, and it is assumed that this processing takes place at an appropriate server, with suitable connections to the Internet. Of course, other hardware configurations could be used as meets the needs of the particular indications that work that is involved. It is also assumed that the system schedules meetings at a point in time that is in advance of the already-known meeting date. Thus, a database of meeting dates can be periodically consulted, and those meetings requiring automatic scheduling on any given date can easily be determined. The processing after step 200 therefore is described with respect to the scheduling of a given gathering or meeting, or, in other words, with respect to automatically scheduling an in-person gathering for the chapter at one venue of several associated with the locale.

To set up a gathering, the candidate venues for the gathering are selected at step 205. The system has a database of venues for public meetings, including information on opening hours and suitability for various kinds of chapters. The system offers a variety of choices to facilitate the selection of venues for the gatherings. For example, a crowded bar might not be the proper venue for practicing Spanish language, and a bar of any kind might not be acceptable for a meeting of a Bible Study chapter. The system automatically selects or rejects candidate venues for the gathering. In particular, the system evaluates the number of members in the chapter, proximity of the venue, and suitability of the venue for the topic, e.g., outdoor spaces for pets. Some of the suitability criteria can be mathematically calculated (such as the seating capacity of a particular venue compared to the average number of attendees for the meeting). Some of the suitability criteria can easily be implemented using appropriate rules (i.e., no topics involving pets in venues that serve food indoors, or, alternatively, all topics involving pets requiring venues that are outdoors). Other, more subtle criteria can be implemented with specific rules as appropriate. It may thus be said that the scheduling of the in-person gathering includes selecting the venue based on a characteristic of the topic and/or a characteristic of the number of active members in the chapter.

In addition, members may provide inputs to propose candidate venues. Venues may be organized by types. A categorization for venues may include a multi-level hierarchical listing similar to the one described above for topics of interest. For example, a particular coffee house may be categorized as follows: it is under the broad category 'public places' and then under the narrower type of 'coffee shops'.

To propose candidate venues, a member can be provided with a listing of venue categories and the member selects the desired venue candidates for the locale. In addition, a member can simply browse through all venues in his locale. For any venue of interest, the member may view information about the venue. The information may include, but is not limited to, venue ratings made by other members, venue location information, directions to the venue and so on.

Venues are then automatically slotted on the ballot and the members are automatically invited to vote at step 210. Members vote on candidate venues in step 215, by means of any of the many well-known techniques for obtaining votes electronically. When the period for voting ends, the system automatically tallies up the votes at step 220. When too few members voted to select the venue, then the gathering may be canceled at step 225. The voters (the interested members who voted) may be directed to a nearby locale where sufficient number of users expressed interest in a gathering or they can be simply notified that the event is cancelled due to a lack of interest. The members are also free to arrange to meet privately using the message boards. When the analysis in step 220 indicates that enough members voted, the system may optionally wait for additional votes for a predetermined period of time at step 230.

When the optional additional voting period ends, the system tallies up the number of votes for various candidate venues in step 235, informs the members of the winning venue, and invites the members to make a reservation (RSVP) for the gathering. To prevent gatherings growing too large for a given venue, the system can also make a determination to split the gathering between two or more venues, based on a configurable threshold of votes, when more than one venue has received a minimum number of votes. This kind of determination may be performed using a configurable threshold for each venue, allowing the system automatically to split up groups exceeding the configuration. This threshold may vary from topic to topic, and chapter to chapter, depending on the needs of the topic and organizers, if any. The threshold may be thought of as a venue attendance threshold, and this threshold may be based on a characteristic of the topic and, in a led chapter, may be set by the organizer.

For example, for a political campaign topic, a gathering will may be set to occur for any venue on the ballot that receives at least 25 votes. In such a case, the system may automatically notify members that that more than one venue has been chosen, and request that the RSVP be made in such a manner as to indicate a chosen venue (which can be different than the one they voted for). This allows a group in a given locale to split into sub-groups that a) are sized appropriately so that a single venue does not become uncomfortably crowded, and b) allow users to meet at the most convenient venue for them, when a given locale has enough members to support multiple gatherings. To put it another way, when the number of votes from the chapter members planning to attend the gathering exceeds a venue attendance threshold, more than one venue for the gathering is automatically selected and the members are notified.

When the RSVP period ends, the system tallies up the number of members giving an affirmative RSVP (RSVPers) to determine if enough people are coming, at step 240. An affirmative RSVP may be thought of as an indication that a chapter member is planning to attend the in-person gathering, or as an attendance plan indication from the member. When less than a predetermined minimum number of members RSVPed in the affirmative, i.e., not enough members plan to attend the gathering, the gathering may be canceled at step 225. The attendance threshold may be determined on various bases, such as an minimum number of e.g. 5 for all gatherings, or may be determined based on a characteristic of the topic, such as 10 for basketball or 4 for bridge.

When the gathering is canceled, the RSVPers may be notified of the cancellation, for example, by email. In addition, the system may provide these RSVPers with a list of other chapters where sufficient interest for the topic was expressed.

As an alternative to canceling the meeting when the number of RSVPs is below the threshold, a special variant of a pre-event reminder mail may be sent, alerting users that turnout may be small so that they can make extra efforts to confirm attendance using message boards provided by the service.

On the other hand, if enough members RSVPed, the gathering takes place at the elected venue and the members who plan to attend are automatically reminded of the gathering, at step 245. One or more reminders may include the winning venue, directions to the winning venue, time and date for the gathering. Moreover, the reminders may include specific aspects of the particular topic to be discussed and so on. Reminders may be sent to only those who RSVPed, or to all chapter members.

After the gathering takes place, the system polls the RSVPers for quantitative and/or qualitative feedback (which includes any suggestions for the next gathering, suitability of the venue, whether the RSVPer attended the gathering, an estimate of the number of people who attended and so on), at step 250. When the user completes the poll, the system automatically sends a thank you message. An end to the process is shown at step 260 for the sake of a clear explanation, and at this step the system also archives the past gathering. The nature of the periodic gatherings, however, dictates that the process recur, and at a suitable time the processing begins again with step 200 for organizing the next gathering.

The messages mentioned above, including requests for RSVP, reminders, and requests for feedback may include appropriate advertising material, such as coupons for discounts at the selected venue or the like.

In a led chapter, the organizer can allow the system to organize the event, and then the process is as illustrated in FIG. 4. Organizers, however, may manually override a number of the above described steps. Organizers provide additional flexibility in organizing the gathering. As already mentioned, the organizer can add extra venues or replace venues on the system's voting ballot. The organizer can nominate new venues, including private homes. The organizer may simply choose a venue for the gathering, thereby overriding the need to vote. In addition, the organizer may select a different venue for gathering after the system tallies up the number of votes. The organizer can also cancel the gathering when there are too few members or for some other reasons. The organizer may set a threshold number of votes below which the gathering is automatically cancelled due to lack of interest and so on. In addition, the organizer may request the members to pre-vote on candidate venues to narrow the list of candidate venues. Moreover, the organizer may send members warning messages that too few members voted or RSVPed for the event, inviting other members to vote or to make an RSVP.

A determination may be made as to whether a chapter for the topic of interest exists in a locale convenient for the user. Such a determination may be performed in a variety of ways, including a calculation showing whether the chapter is within a predetermined radius such as one hundred miles, or a calculation utilizing latitude/longitude related information. When the chapter for the topic of interest does not exist in a locale convenient for the user, the user may automatically be invited a) to join a chapter for this topic of interest at a distant locale that is closest to the locale of the user, b) start his own chapter as an organizer, c) presented with a list of nearby chapters in related topics, selection of which is automatically calculated based on cross-membership information (e.g., 'Members who signed up for Spanish Language chapters also signed up for Spanish Expat chapters') or d) add his name to a waiting list users who want to be informed when other chapters start nearby. The system can automatically detect when a predetermined number of users have indicated interest in a topic within a locale, and automatically determine to start a new chapter, electronically notifying the interested persons of the establishment of the chapter, and automatically schedule a first meeting.

In the illustrative, non-limiting embodiments mentioned above, gatherings are facilitated by allowing internet users all over the world to search for a topic of interest and find a real-world, local group that meets on that topic nearby. In addition, these exemplary systems allow users to form local groups around a common interest, and associate those local interest groups with similar groups around the world.

The above and other features of the invention including various novel method steps and a system of the various modules have been particularly described with reference to the accompanying drawings and pointed out in the claims. It will be understood that the particular process and construction of parts embodying the invention is shown by way of illustration only and not as a limitation of the invention. The principles and features of this invention may be employed in varied and numerous embodiments without departing from the spirit and scope of the invention as defined by the appended claims.

What is claimed is:

1. A computer-implemented method for organizing meeting groups or events over a network, comprising:
    identifying a location associated with a user, wherein the location associated with the user is identified based on at least one of the following: an input of the user, an actual location of the user, an actual location of a mobile device used by the user, or any combination thereof;
    prompting the user, through a graphical user interface, to input a topic of interest;
    receiving the topic of interest from the user;
    searching, with at least one processor, a database of in-person meeting groups or events to determine if the database includes at least one meeting group or event corresponding to the topic of interest and within a specified distance of the location;
    automatically determining that the database does not include at least one meeting group or event corresponding to the topic of interest and within the specified distance of the location;
    in response to determining that the database does not include the at least one meeting group or event corresponding to the topic of interest and within the specified distance of the location, automatically displaying, to the user through a graphical user interface, an option to start a meeting group or event corresponding to the topic of interest and the location;
    in response to determining that the database does not include at least one meeting group or event corresponding to the topic of interest and within the specified distance of the location, displaying at least one meeting group or event corresponding to the topic of interest that is outside the specified distance;
    in response to determining that the database does not include at least one meeting group or event corresponding to the topic of interest and within the specified distance of the location, automatically displaying, to the user through a graphical user interface, an option to be notified when a meeting group or event corresponding to the topic of interest and the location is created; and
    transmitting, with at least one processor, a notification to the user when the meeting group or event corresponding to the topic of interest and the location is created.

2. The computer-implemented method of claim 1, wherein the option to start a meeting group and the option to be notified are displayed on the same graphical user interface.

3. The computer-implemented method of claim 1, wherein the specified distance is determined based at least partially on at least one of the following: a region that the location is in, a town that the location is in, a predetermined radius from the location, a predetermined radius from a region or town that the location is in, a difference in latitudinal and longitudinal coordinates, or any combination thereof.

4. The computer-implemented method of claim 1, wherein the option to start a meeting group or event comprises at least one of the following: a button, an icon, a hyperlink, a menu, or any combination thereof, and wherein the option, when selected, causes a further graphical user interface to be displayed, the further graphical user interface programmed to receive user input and to create a meeting group or event based on the user input.

5. The computer-implemented method of claim 1, further comprising: in response to determining that the database does not include at least one meeting group or event corresponding to the topic of interest and within the specified distance of the location, displaying at least one meeting group or event corresponding to at least one topic related to the topic of interest that is within the specified distance.

6. The computer-implemented method of claim 5, wherein the at least one topic related to the topic of interest is automatically selected based at least partially on cross-membership information of other users.

7. The computer-implemented method of claim 6, wherein the at least one topic related to the topic of interest is automatically selected by:
    identifying at least one other user that signed up for a meeting group or event corresponding to the topic of interest in another location; and
    identifying at least one other meeting group or event that the at least one other user signed up for, wherein a topic corresponding to the at least one other meeting group is determined to be the at least one topic related to the topic of interest.

8. A system for organizing meeting groups or events over a network, comprising:
    (a) at least one data storage device comprising data representing a plurality of meeting groups or events, each meeting group or event of the plurality of meeting groups or events corresponding to a location and at least one topic;
    (b) at least one server computer comprising at least one processor and in communication with the at least one data storage device, the at least one server computer programmed to:
        (i) prompt a user, through a graphical user interface, to input a topic of interest, wherein the user is associated with a location, and wherein the location associated with the user is identified based on at least one of the following: an input of the user, an actual location of the user, an actual location of a mobile device used by the user, or any combination thereof;
        (ii) determine if at least one meeting group or event of the plurality of meeting groups or events stored in the at least one data storage device corresponds to the topic of interest and is within a specified distance from the location associated with the user;
        (iii) determine that the plurality of meeting groups or events does not include at least one meeting group or event corresponding to the topic of interest that is within the specified distance from the location associated with the user;

(iv) display at least one meeting group or event corresponding to the topic of interest that is outside the specified distance in response to determining that the plurality of meeting groups or events does not include at least one meeting group or event corresponding to the topic of interest that is within the specified distance from the location associated with the user;

(v) in response to determining that the plurality of meeting groups or events does not include at least one meeting group or event corresponding to the topic of interest that is within the specified distance from the location associated with the user, automatically display a selectable option to be notified when a meeting group or event corresponding to the topic of interest and within the specified distance from the location is created by another user;

(vi) in response to the user selecting the selectable option to be notified, automatically add the user to a list corresponding to the topic of interest and the location, or automatically display a further graphical user interface programmed to facilitate the user to be added to the list; and (vii) transmit a notification to the user when a meeting group or event is created that corresponds to the topic of interest and is within a specified distance from the location.

9. The system of claim 8, wherein the at least one server computer is further programmed to:

in response to determining that the plurality of meeting groups or events does not include at least one meeting group or event corresponding to the topic of interest that is within the specified distance from the location associated with the user, display a selectable option to start a meeting group or event corresponding to the topic of interest and the location to the user through a graphical user interface; and in response to the user selecting the selectable option to start a meeting group or event, display a further graphical user interface programmed to facilitate the user to create a meeting group or event.

10. The system of claim 8, wherein the at least one server computer is further programmed to:

identify at least one meeting group or event corresponding to at least one topic related to the topic of interest that is within the specified distance; and display the at least one meeting group or event corresponding to the at least one topic related to the topic of interest.

11. The system of claim 10, wherein the at least one topic related to the topic of interest is identified based at least partially on cross-membership information of other users.

12. The system of claim 11, wherein the at least one topic related to the topic of interest is identified by:

identifying at least one other user that signed up for a meeting group or event corresponding to the topic of interest in another location;

identifying at least one other meeting group or event that the at least one other user signed up for, wherein a topic corresponding to the at least one other meeting group is determined to be the at least one topic related to the topic of interest.

13. The system of claim 8, wherein the at least one server computer is further programmed to:

in response to determining that the plurality of meeting groups or events does include at least one meeting group or event corresponding to the topic of interest that is within the specified distance from the location associated with the user, display a selectable option to: join the at least one meeting group or event, RSVP to the at least one meeting group or event, receive notifications for the at least one meeting group or event, or any combination thereof.

14. A computer program product for organizing meeting groups or events over a network, the computer program product comprising at least one non-transitory computer-readable medium including program instructions that, when executed by at least one processor of at least one computer, cause the at least one computer to:

identify a location associated with a user, wherein the location associated with the user is identified based on at least one of the following: an input of the user, an actual location of the user, an actual location of a mobile device used by the user, or any combination thereof;

receive, from the user, a topic of interest;

search a database of meeting groups or events based at least partially on the location associated with the user and the topic of interest;

determine, based at least partially on the search, if the database includes at least one meeting group or event within a specified distance of the location and corresponding to the topic of interest;

determine that the database does not include the at least one meeting group or event corresponding to the topic of interest and within the specified distance of the location;

if the database does include the at least one meeting group or event within the specified distance of the location and corresponding to the topic of interest, automatically display the at least one meeting group or event to the user; and if the database does not include the at least one meeting group or event within the specified distance of the location and corresponding to the topic of interest, automatically generate a graphical user interface comprising at least two of the following: a selectable option to start a meeting group or event corresponding to the location and the topic of interest, a selectable option to be notified when a meeting group or event corresponding to the topic of interest and within a specified distance of the location is created, a meeting group or event corresponding to at least one topic related to the topic of interest that is within the specified distance, a meeting group or event corresponding to the topic of interest that is outside the specified distance, or any combination thereof.

15. The computer program product of claim 14, wherein the graphical user interface comprises the selectable option to start a meeting group or event corresponding to the location and the topic of interest, and wherein the selectable option to start a meeting group or event, when selected, causes a further graphical user interface to be generated that facilitates the user to create a meeting group or event.

16. The computer program product of claim 14, wherein the graphical user interface comprises the selectable option to be notified, wherein the selectable option to be notified, when selected, causes the user to be added to a notification list corresponding to the topic, and wherein the program instructions, when executed by the at least one processor of the at least one computer, further cause the at least one computer to transmit a notification to the user when a meeting group or event corresponding to the topic and within the specified distance is created.

17. The computer program product of claim 14, wherein the graphical user interface comprises the meeting group or event corresponding to at least one topic related to the topic of interest that is within the specified distance, and wherein the at least one topic related to the topic of interest is automatically selected based at least partially on cross-membership information of other users.

18. The computer program product of claim 17, wherein the program instructions, when executed by at least one processor of at least one computer system, further cause the at least one computer system to:
- identify at least one other user that signed up for a meeting group or event corresponding to the topic of interest in another location; and
- identify at least one other meeting group or event that the at least one other user signed up for, wherein a topic corresponding to the at least one other meeting group is determined to be the at least one topic related to the topic of interest.

19. A computer-implemented method for organizing meeting groups and/or events over a network, comprising:
- (a) receiving a topic of interest from a user over the network, the user associated with a location, wherein the location associated with the user is identified based on at least one of the following: an input of the user, an actual location of the user, an actual location of a mobile device used by the user, or any combination thereof;
- (b) searching a database of meeting groups and/or events for at least one meeting group and/or event that corresponds to the topic of interest and is proximate to the location associated within the user;
- (c) determining that the database does not include a meeting group and/or event that is proximate to the location and corresponds to the topic of interest;
- (d) after determining that the database does not include a meeting group and/or event that is proximate to the location and corresponds to the topic of interest, automatically generating a graphical user interface comprising at least two of the following:
  - (i) a selectable option to start a meeting group and/or event corresponding to the location and the topic of interest, wherein the selectable option, when selected, causes a further graphical user interface to be displayed, the further graphical user interface programmed to receive user input and to create a meeting group or event based on the user input;
  - (ii) a selectable option to be notified when a meeting group or event corresponding to the topic of interest and within a specified distance of the location is created, wherein the selectable option to be notified, when selected, causes the user to be added to a notification list corresponding to the topic of interest and the location;
  - (iii) a meeting group or event corresponding to at least one topic related to the topic of interest that is within the specified distance;
  - (iv) a meeting group or event corresponding to the topic of interest that is outside the specified distance; or
  - (v) any combination thereof.

20. The computer-implemented method of claim 19, further comprising:
- determining if the user has previously started or created a group or event, wherein the graphical user interface comprises the selectable option to start a meeting group and/or event corresponding to the location and the topic of interest only if it is determined that the user has not previously started or created a group or event.

\* \* \* \* \*